Patented Sept. 12, 1933

1,926,246

UNITED STATES PATENT OFFICE 1,926,246

ASPHALT EMULSION

Preston R. Smith, Rahway, N. J., assignor to The Barber Asphalt Company, Philadelphia, Pa., a corporation of West Virginia No Drawing. Application July 3, 1928
Serial No. 290,273

9 Claims. (Cl. 134—1)

My invention relates to asphalt emulsions.

Asphalt emulsions comprising natural and artificial asphalt dispersed in an aqueous dispersing medium, have been heretofore produced and have been found of substantial value for various purposes, as, for example, binders, adhesives, coating compositions, and in the making and patching of roadways, etc.

In the production of asphalt emulsions heretofore it has been known to use a large variety of dispersing agents, or protective colloids as, for example, soaps, saponaceous materials, proteins, pectins, polysaccharides, hemicelluloses, gums, tannins, clays, etc., but such dispersing agents as have heretofore been used, and the emulsions produced thereby, have been found to be open to objection in that where the water used is hard, i. e. contains relatively large amounts of calcium or magnesium salts, it is frequently impossible to prepare stable emulsions with certain dispersing agents unless an excessive amount of dispersing agent is used. Further, many of the heretofore known dispersing agents, as soaps, gums, etc., are such excellent frothing agents that the emulsions made from them are initially largely foam and must be stored until the foam has subsided before they can be packaged. Further, as is well known, asphalt emulsions in use are usually dried out, i.e. the water eliminated by evaporation, and hence the dispersing agent remains in the asphalt and frequently has a deleterious effect on the asphalt, or its presence is undesirable.

Now in accordance with my invention I have discovered that if asphalt be dispersed in an aqueous solution containing a trialkali phosphate that an excellent emulsion of high stability may be produced, and even with the use of water of a hardness such as to render it unusable for the production of emulsions of prior methods. Further in accordance with my invention, I have discovered that under certain conditions the inclusion of an alkali borate in the dispersing medium, in addition to a trialkali phosphate, will insure the stability of emulsions even when very substantially diluted.

In accordance with my invention I may use as the trialkali phosphate, for example, trisodium phosphate, tri ammonium phosphate, and the like, and as the alkali borate I may use, for example, borax, potassium tetraborate and the like; and either the trialkali phosphate alone, or with an alkali borate may be used in aqueous solution as a dispersing medium, or the trialkali phosphate alone, or with an alkali borate may be included in an aqueous dispersing medium containing heretofore known emulsifying agents, or protective colloids.

In the practical adaptation of my invention, I preferably utilize a dispersing medium containing a trialkali phosphate to a concentration within about the range 0.01M-0.06M and where an alkali borate is also used I preferably use such in the ratio of 2.M-4.M of alkali borate to 1.M of trialkali phosphate, or 0.03M-0.18M of alkali borate to 0.01M-0.06M trialkali phosphate per liter.

By way of illustration of the practical adaptation of my invention, for example, a stable emulsion may be prepared by adding say 70 parts, more or less, of natural or artificial asphalt in a heated condition to a solution of trisodium phosphate in water having a concentration of about 0.02M. With agitation emulsification will take place very rapidly and it will be understood that hard water may be used. In the emulsification of the asphalt foaming will not occur to any appreciable extent and the resultant emulsion will be found to be highly stable, while on drying the asphalt will be found to have the same properties as before emulsification.

As a further illustration, for example, say about 70 parts by weight of Trinidad oil asphalt may be emulsified with about thirty parts of an aqueous dispersing medium containing trisodium phosphate about 0.039M and borax about 0.117M per liter. The resultant emulsion will be stable and may be diluted with considerable amounts of water without causing the asphalt to separate.

As further illustrations, for example, asphalt may be emulsified with an aqueous dispersing medium containing 0.2% tapioca British gum and 0.8% $Na_3PO_4$–$12H_2O$, or with an aqueous dispersing medium containing 1.4% trisodium phosphate, 4.0% borax and 0.5% oleic acid.

As has been indicated, the emulsions produced according to my invention will be readily prepared, it being frequently only necessary to agitate the mixture of asphalt and dispersing medium as by boiling the dispersing medium after the addition of the asphalt, and foaming will be avoided. The emulsions produced will be of high stability and the asphalt residue on drying of the emulsions will have the same properties as the original asphalt.

Having now fully described my invention, what

I claim and desire to protect by Letters Patent is:

1. An emulsion including asphalt dispersed in an aqueous solution containing a trialkali phosphate.

2. An emulsion including asphalt dispersed in an aqueous solution containing a trialkali phosphate and a protective colloid.

3. An emulsion including asphalt dispersed in an aqueous solution containing a trialkali phosphate.

4. An emulsion including asphalt dispersed in an aqueous solution containing a tri-alkali phosphate and an alkali borate.

5. An emulsion including asphalt dispersed in an aqueous solution containing a tri-alkali phosphate and borax.

6. An emulsion including asphalt dispersed in an aqueous solution containing trisodium phosphate and an alkali borate.

7. An emulsion including asphalt dispersed in an aqueous solution containing trisodium phosphate and borax.

8. An emulsion including asphalt dispersed in an aqueous solution containing a tri-alkali phosphate and an alkali borate in the ratio 0.01M–0.06M tri-alkali phosphate to 0.03M–0.18M alkali borate per liter.

9. An emulsion including asphalt dispersed in an aqueous solution containing trisodium phosphate and borax in the ratio 0.01M–0.06M trisodium phosphate to 0.03M–0.18M borax per liter.

PRESTON R. SMITH.

CERTIFICATE OF CORRECTION.

Patent No. 1,926,246.  September 12, 1933.

PRESTON R. SMITH.

It is hereby certified that error appears in the printed specification of the above numbered patent requiring correction as follows: Page 2, line 10, claim 3, for "a trialkali" read trisodium; and that the said Letters Patent should be read with this correction therein that the same may conform to the record of the case in the Patent Office.

Signed and sealed this 5th day of December, A. D. 1933.

F. M. Hopkins (Seal)  Acting Commissioner of Patents.